United States Patent

Lallier et al.

[19]

[11] Patent Number: 6,040,285

[45] Date of Patent: Mar. 21, 2000

[54] COMPOSITION FOR STRIPPING PAINTS, VARNISHES OR LACQUERS

[75] Inventors: Jean-Pierre Lallier, Courbevoie; Patrick Marie, Houilles; Jean-Marie Aubry, Oignies; Marie-José Marti, Templeuve; Valérie Del Nero, Lille, all of France

[73] Assignee: Elf Atochem, S.A., France

[21] Appl. No.: 08/986,407

[22] Filed: Dec. 8, 1997

[30] Foreign Application Priority Data

Dec. 6, 1996 [FR] France .................................. 96 15040

[51] Int. Cl.[7] .............................. C09D 9/00; C09D 9/04; C11D 9/04; C11D 7/52

[52] U.S. Cl. ..................... 510/206; 510/203; 510/210; 510/213

[58] Field of Search .................................. 510/201, 202, 510/203, 206, 210, 213

[56] References Cited

U.S. PATENT DOCUMENTS

| | | | |
|---|---|---|---|
| 1,147,849 | 7/1915 | Ellis .......................................... | 510/210 |
| 2,507,983 | 5/1950 | Kuentzel ................................. | 252/144 |
| 2,507,984 | 5/1950 | Kuentzel ................................. | 252/143 |
| 2,507,985 | 5/1950 | Kuentzel ................................. | 252/143 |
| 3,322,677 | 5/1967 | Rosenfeld ............................... | 252/153 |
| 4,120,810 | 10/1978 | Palmer ...................................... | 252/153 |
| 4,246,130 | 1/1981 | Koch ........................................ | 252/143 |
| 4,578,209 | 3/1986 | Hisamoto et al. ...................... | 252/143 |
| 4,732,695 | 3/1988 | Francisco ................................ | 252/162 |
| 4,986,936 | 1/1991 | Wolbers ................................... | 252/170 |
| 5,413,729 | 5/1995 | Gaul ......................................... | 252/162 |
| 5,744,694 | 4/1998 | Berte et al. .............................. | 44/266 |

FOREIGN PATENT DOCUMENTS

| | | |
|---|---|---|
| 0 497 130 | 8/1992 | European Pat. Off. . |
| 93/07227 | 4/1993 | WIPO . |

*Primary Examiner*—Yogendra Gupta
*Assistant Examiner*—John M Petruncio
*Attorney, Agent, or Firm*—Millen, White, Zelano & Branigan

[57] ABSTRACT

This composition for stripping paints, varnishes or lacquers coating a substrate is characterized in that it consists of or comprises:

(A) 1 to 100 parts by weight of a mixture (A1) of at least one aromatic solvent chosen from benzaldehyde, toluene, xylene and anisole and (A2) of benzoic acid;

(B) 99 to 0 parts by weight of water;

(A)+(B) representing in total 100 parts by weight.

In particular, (A) consists of a commercial benzaldehyde which contains benzoic acid.

14 Claims, No Drawings

COMPOSITION FOR STRIPPING PAINTS, VARNISHES OR LACQUERS

CROSS-REFERENCE TO RELATED APPLICATIONS

This application is related to the following concurrently filed applications: Attorney Docket No.: CHAIL 25, entitled "Composition for Stripping Paints, Varnishes or Lacquers" by Jean-Pierre Lallier, U.S. application Ser. No. 08/987,138, filed Dec. 8, 1997, based on French Priority applications 96/15042 and 97/02345 filed Dec. 6, 1996 and Feb. 27, 1997, respectively; and, Attorney Docket No.: CHAIL 26, entitled "Aqueous Composition for Stripping Paints and Primers with a High Degree of Crosslinking" by Jean-Pierre Lallier, U.S. application Ser. No. 08/987,137, filed Dec. 8, 1997, now U.S. Pat. No. 5,980,626, based on French Priority application 96/15041 filed Dec. 6, 1996, all of these applications being incorporated by reference herein.

FIELD OF THE INVENTION

The present invention relates to a composition for stripping paints, varnishes or lacquers coating a substrate.

BACKGROUND OF THE INVENTION

In the field of stripping paints, varnishes or lacquers, the current tendency is to develop efficient aqueous formulations using the least possible amount of solvent, in order to limit the effects on the environment. However, the aqueous formulations which are currently developed are relatively inefficient and, for this reason, none of them are mentioned in the Kirk-Othmer Encyclopaedia of Chemical Technology (4th edition, 1996, vol. 17).

International patent application WO/07227 discloses the addition of water to solvent or to mixtures of solvents which are considered to be efficient paint strippers. That document describes compositions containing:

(1) at least one organic solvent chosen from ethyl acetate, methyl ethyl ketone and toluene;

(2) water;

(3) at least one thickener, and (4) at least one surfactant.

The efficacy of these composition is simply proportional to the amount of organic solvent used and, in any case, is lower than the efficacy of the pure solvent. This is true in particular for toluene, which is the solvent most capable of stripping paints out of the three mentioned.

Moreover, in the case of fully solvent-laden formulations, it is common to use acidic or basic activators, (generally, less than 20% by weight of the total formulation). Among the acidic activators usually found are citric acid, formic acid and acetic acid. Formic acid is the most effective and the one most commonly used (Kirk-Othmer Encyclopaedia of Chemical Technology, 4th edition, 1996, vol. 17). However, this acid can cause serious burns and it is thus of prime importance to develop formulations activated with less corrosive acids.

The aim of the present invention is to propose a composition for stripping paints, varnishes and lacquers which does not have the drawbacks of the prior art.

SUMMARY OF THE INVENTION

To this end, it has not been discovered, surprisingly, that benzoic acid, which has not been mentioned in the literature as an acidic activator, is highly efficient for this acid-activated function, provided that it is combined with an aromatic solvent, which can advantageously be commercial benzaldehyde, which already contains the abovementioned benzoic acid. Moreover, it has been discovered that the resulting stripping compositions can contain a large amount of water while at the same time, however, conserving high stripping efficiency. The reason for this is that advantageous synergism has been obtained between the water and commercial benzaldehyde, it being possible for the latter to be replaced by another aromatic solvent supplemented with benzoic acid.

The subject of the present invention is thus, firstly, a composition for stripping paints, varnishes or lacquers coating a substrate, characterized in that it consists of or comprises:

(A) 1 to 100 parts by weight of a mixture (A1) of at least one aromatic solvent chosen from benzaldehyde, toluene, xylene and anisole and (A2) of benzoic acid;

(B) 99 to 0 parts by weight of water;

(A)+(B) representing in total 100 parts by weight.

In accordance with a first particularly advantageous embodiment of the composition according to the invention, (A) consists of commercial benzaldehyde which, in this case, already contains benzoic acid. (A) can then advantageously represent 5 to 10 parts by weight of (A)+(B).

According to another embodiment, for all of the systems, the various components can, for example, be present in the following proportions:

(A1) aromatic solvent(s): 30–70 parts by weight (A2) benzoic acid: 0.05–10 parts by weight (B) water: 30–70 parts by weight.

To the Applicant Company's knowledge, benzaldehyde is not mentioned in the literature with regard to paint stripping. However, this solvent proved to be of high performance in paint stripping if it is not distilled and used under inert atmosphere. In this case, it always contains a variable proportion of benzoic acid. In commercial bottles, the level of benzoic acid remains equal to or less than 10% by weight, but, during the (air) stripping operation, this level, can rise considerably (it being possible for the air-oxidation to be catalysed by the film of paint). The inventors have frequently observed a benzoic acid salt during stripping with a formulation containing commercial benzaldehyde, and have thus discovered that the water/pure benzaldehyde/benzoic acid combination was particularly effective. One astute way of preparing the pure benzaldehyde/benzoic acid mixture is to use commercial benzaldehyde. This combination is of even higher performance than the water/toluene/benzoic acid combination and can comprise a majority of water. Commercial benzaldehyde is thus able to function both as a solvent and as an activator.

The composition according to the invention can also contain at least one additive chosen from:

activators, such as sodium benzoate and, when the aromatic solvent is benzaldehyde, toluene, in a proportion in particular of from 0.1 to 10 parts by weight relative to (A)+(B) (as indicated below, the sodium benzoate also acts as a corrosion inhibitor);

thickeners, such as cellulosic and acrylic thickeners, in a proportion in particular of from 0.1 to 10 parts by weight relative to (A)+(B); as an example of a cellulosic thickener, mention may be made of Methocell 311 sold by the company Dow Chemical Co., whose production process is featured in American patent U.S. Pat. No. 3,388,082 entitled "hydroxypropyl methyl cellulose ethers";

corrosion inhibitors, such as monoethanolamine, sodium benzoate or citric acid, in a proportion in particular of from 0.1 to 10 parts by weight relative to (A)+(B);

evaporation retardants, such as paraffin, in a proportion in particular of from 0.1 to 10 parts by weight relative to (A)+(B); and surfactants, such as nonionic surfactants, in a proportion in particular of from 0.1 to 10 parts by weight relative to (A)+(B); as examples of nonionic surfactants, mention may be made of the ethoxylated surfactants of the "Metox" series sold by the company "SEPPIC".

The water and the aromatic solvent (preferably commercial benzaldehyde or toluene, for example) are immiscible. The result of this is to give a water/aromatic solvent emulsion. This emulsion is very unstable and separation of the two phases is rapidly observed. In order to use this emulsion as it is, the mixture needs to be stirred vigorously. The emulsion can also be stabilized by adding a surfactant or a surfactant system. The stabilization can also be achieved by adding a thickener.

The aqueous formulations described can be used for stripping by the general public (thickened formulations), professional building stripping (thickened formulations), industrial stripping (non-thickened formulations), and, lastly, aeronautical stripping (thickened formulations). These thickened or unthickened formulations can, as already indicated, contain an activator, an evaporation retardant or a corrosion inhibitor.

The examples which follow will make it possible to obtain a clearer idea of the invention. All the proportions mentioned in the examples are parts by weight.

EXAMPLE 1

Commercial benzaldehyde "B", containing 1% by weight of benzoic acid, or a 70/30 water/commercial benzaldehyde mixture referred to hereinbelow as "70/30 W/B", was used as stripping composition.

The stripping tests were carried out on a glycerophthalic paint applied on wood. When an old paint is involved, a high degree of crosslinking is present. Two disks of cotton impregnated with solvent are placed on the samples and covered with the lid of a Petri dish in order to limit evaporation. The stripping was continued for 24 hours and quantified by a grading system between 0 (no action) and 5 (stripping of all the layers of paint to leave the support naked). The conventions adopted for attributing the intermediate grades are given below:

Grade 0=no action

Grade 1=appearance of a few blisters

Grade 2=formation of a few flakes

Grade 3=removal of the first layers with formation of flakes

Grade 4=removal of all the layers except the last

Grade 5=support stripped naked by removal of all of the layers.

Since water and benzaldehyde are immiscible, the water/benzaldehyde mixture is in the form of an emulsion. This very unstable emulsion is homogenized by drawing the mixture up from and squirting it back into the bottle several times before impregnating the cotton.

TABLE 1

Stripping power at 20° C. of "B" and "W/B (70/30)" on a glycerophthalic paint applied on wood.

| | Grade | |
|---|---|---|
| Time | B | W/B (70/30) |
| 5 min. | 0 | 1 |
| 10 min. | 0 | 3 |
| 15 min. | 1 | 4 |
| 20 min. | 3 | 4 |
| 25 min. | 4 | 4 |
| 30 min. | 4 | 4 |
| 1 h | 5 | 5 |
| 2 h | 5 | 5 |
| 24 h | 5 | 5 |

After one hour, "B" and "W/B (70/30)" have completely stripped the support naked. However, it is observed that formulation "W/B (70/30)" is faster than B. There is thus synergism between the water and the benzaldehyde, which is reflected on this glycerophthalic paint by an effect of acceleration to short times (less than 30 min.).

EXAMPLE 2

The stripping tests in this example were carried out on an epoxy paint applied by cataphoretic electroplating onto a phosphate-treated steel. Two disks of cotton impregnated with solvent were placed on the samples and covered with the lid of a Petri dish in order to limit evaporation. The stripping was carried out for 24 hours and quantified by a grading system between 0 (no action) and 5 (support stripped naked). The conventions adopted for assigning the intermediate grades are given below:

Grade 0=no action

Grade 1=20% of the surface is blistered

Grade 2=40% of the surface is blistered

Grade 3=60% of the surface is blistered

Grade 4=80% of the surface is blistered

Grade 5=total removal of the film of paint.

The results obtained are given in Table 2 below:

TABLE 2

Stripping power at 20° C. of "B" and "W/B (70/30)" on an epoxy paint applied to steel. (B = commercial benzaldehyde).

| | Grade | |
|---|---|---|
| Time | B | W/B (70/30) |
| 10 min. | 0 | 0 |
| 20 min. | 0 | 0 |
| 30 min. | 0 | 0 |
| 1 h | 0 | 0 |
| 2 h | 0 | 5 |
| 4 h | 0 | 5 |
| 24 h | 5 | 5 |

The epoxy paint detaches from its support after 2 hours with the composition "W/B (70/30)". On the other hand, it takes 24 hours for the same effect to be achieved with "B". These results clearly show the superiority of the composition of "W/B" type and thus the synergism effect compared with "B".

EXAMPLE 3

In this example, the paint to be stripped and the stripping conditions are rigorously identical to those of Example 2.

This example shows the effect of sodium benzoate as an activator on the composition of "W/B" type. The sodium benzoate was used in a proportion of 1% by weight relative to the benzaldehyde. The results obtained are given in Table 3.

TABLE 3

Effect of sodium benzoate on the "W/B (70/30)" mixture for stripping an epoxy paint at T = 20° C. B = commercial benzaldehyde.

| | Grade | |
|---|---|---|
| Time | W/B (70/30) | W/B (70/30) + sodium benzoate |
| 1 h | 0 | 2 |
| 1 h 10 | 1 | 5 |
| 1 h 20 | 2 | 5 |
| 1 h 30 | 3 | 5 |
| 1 h 40 | 5 | 5 |

It is observed that the effect of the sodium benzoate is to accelerate the stripping using the "W/B (70/30)" composition.

EXAMPLE 4

In this example, paints from the motor vehicle industry were used: glacier-white 389 polyester lacquers from Herberts, supplied by the company Etalon (France). The thickness of the coating is 35 to 45 µm. The metal plates used are made of phosphate-treated steel and have a rectangular coated area of 90×190 mm. The performance levels on these plates are generally similar to other paints that are easier to strip than polyester paints, which is generally the case for glycerophthalic, alkyd and acrylic paints. The results are featured in Table 4.

TABLE 4

Stripping power at 20° C. of "B", "W/B", and "W/B/T" (T = toluene) on a polyester paint. B = commercial benzaldehyde

| Formulation | Stripping time in min. |
|---|---|
| B | 12 |
| W/B (50/50) | 12 |
| W/B/T (50/45/5) | 7 |
| W/B (95/5) | 10 |
| W/B/T (95/5/5) | 7 |

The stripping power of "B" on this polyester paint is conserved even when it is diluted to 50% or 95% in water. Addition of 5% toluene to the dilute mixtures leads to a very marked improvement in their stripping power. This example shows the possibility of making mixtures which contain a lot of water and which are very effective (90% water and 10% solvent).

Examples 3 and 4 thus show that sodium benzoate and toluene can be very good activators of W/B mixtures.

EXAMPLE 5

In this example, the paint to be stripped and the stripping conditions are rigorously identical to those of Example 4.

This example shows the specificity of benzaldehyde to give excellent paint stripping performance. For this, small molecules (which are thus more capable of diffusing in the film of paint) and which contain the aldehyde function —CHO were tested. Molecules whose structure is very close to that of benzaldehyde were also tested.

The results are given in Table 5.

TABLE 5

Stripping power at 20° C. of molecules containing the aldehyde function on a polyester paint.

| Compound | Stripping time |
|---|---|
| Formaldehyde | >1 h |
| Formamide | >1 h |
| Methyl formate | >1 h |
| 4-Methoxybenzaldehyde | >1 h |
| 1,3,5-Trimethyl-benzaldehyde | >1 h |
| Benzyl alcohol | >1 h |
| Benzaldehyde | 12 min. |

EXAMPLES 6 to 11 (of the Invention) and 12 Comparative)

The paint to be stripped and the stripping conditions are rigorously identical to those of Example 4. The stripping compositions used are featured in Table 6, in which the following abbreviations have been used:

W=water
B=commercial benzaldehyde
T=toluene
X=xylene
AN=anisole (methoxybenzene)
BA=benzyl alcohol
ba=benzoic acid The results obtained are also given in Table 6.

TABLE 6

Stripping power at 20° C. of mixtures based on aromatic compounds supplemented with benzoic acid on a polyester paint

| Example | Composition | Stripping time in min. |
|---|---|---|
| 6 | W/B (50/50) | 12 |
| 7 | W/T/ba (50/45/5) | 13 |
| 8 | W/B (95/5) | 10 |
| 9 | W/T/ba (90/5/5) | 40 |
| 10 | W/AN/ba (50/45/5) | 20 |
| 11 | W/X/ba (50/45/5) | 32 |
| 12 | W/BA/ba (50/45/5) | 700 |

EXAMPLE 13

The stripping test is identical to that of Example 4. It was carried out on a thickened on of the type:

| Water | 50 |
|---|---|
| Anisole | 40 |
| Commercial benzaldehyde | 10 |

-continued

| | |
|---|---|
| Ethoxylated methyl ester fraction comprising 20 ethylene oxide units, marketed by the company "SEPPIC" under the name "Metox 20 EO" | 1 |
| Cellulosic thickener marketed by the company "Dow Chemical Co." under the name "Methocell 311" | 1.3 |

This thickened, very stable formulation leads to a time of 18 min. on an Etalon polyester plate.

The preceding examples can be repeated with similar success by substituting the generically or specifically described reactants and/or operating conditions of this invention for those used in the preceding examples.

The entire disclosure of all applications, patents and publications, cited above and below, and of corresponding French application 96/15040, are hereby incorporated by reference.

From the foregoing description, one skilled in the art can easily ascertain the essential characteristics of this invention, and without departing from the spirit and scope thereof, can make various changes and modifications of the invention to adapt it to various usages.

We claim:

1. A composition for stripping paints, varnishes or lacquers from a substrate, comprising:
   (A) a mixture of (A1) at least one aromatic solvent selected from the group consisting of benzaldehyde and anisole, and of (A2) benzoic acid;
   (B) 99 to 30 parts by weight of water;
   (A)+(B) equals in total 100 parts by weight.

2. A stripping composition according to claim 1, wherein (A) is a mixture consisting of an impure benzaldehyde containing benzoic acid.

3. A Composition according to claim 1 having the following proportions:
   (A1) aromatic solvent(s): 30–70 parts by weight
   (A2) benzoic acid: 0.05–10 parts by weight
   (B) water: 30–70 parts by weight.

4. A composition according to claim 1, further comprising at least one activator, in a proportion of from 0.1 to 10 parts by weight relative to (A)+(B).

5. A composition according to claim 1, further comprising at least one thickener, in a proportion of from 0.1 to 10 parts by weight per 100 parts by weight of (A)+(B).

6. A composition according to claim 1, further comprising at least one corrosion inhibitor selected from a group consisting of monoethanolamine and citric acid, in a proportion of from 0.1 to 10 parts by weight per 100 parts by weight of (A)+(B).

7. A composition according to claim 1, further comprising at least one evaporation retardant in a proportion of from 0.1 to 10 parts by weight per 100 parts by weight of (A)+(B).

8. Composition according to claim 1, characterized in that it also contains at least one surfactant chosen in particular from nonionic surfactants, in a proportion in particular of from 0.1 to 10 parts by weight per 100 parts by weight of (A)+(B).

9. A composition according to claim 3, wherein the aromatic solvent is benzaldehyde.

10. A composition according to claim 4, wherein the activator is sodium benzoate.

11. A composition according to claim 4, wherein the aromatic solvent is benzaldehyde and the activator is toluene.

12. A composition according to claim 5, wherein the thickener is a cellulosic or acrylic thickener.

13. A composition according to claim 7, wherein the evaporation retardant is paraffin.

14. A composition according to claim 8, wherein the surfactant is nonionic.

* * * * *